US008730861B2

(12) United States Patent
Montojo et al.

(10) Patent No.: US 8,730,861 B2
(45) Date of Patent: May 20, 2014

(54) RATE MATCHING FOR DATA AND CONTROL CHANNELS IN WIRELESS COMMUNICATION SYSTEMS

(75) Inventors: Juan Montojo, San Diego, CA (US); Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 13/164,709

(22) Filed: Jun. 20, 2011

(65) Prior Publication Data

US 2012/0155362 A1 Jun. 21, 2012

Related U.S. Application Data

(60) Provisional application No. 61/356,743, filed on Jun. 21, 2010.

(51) Int. Cl.
*H04H 20/71* (2008.01)
(52) U.S. Cl.
CPC ..................................... *H04H 20/71* (2013.01)
USPC .......................................... 370/312; 455/436
(58) Field of Classification Search
CPC ..................................................... H04H 20/71
USPC ................... 370/312; 455/436, 435
See application file for complete search history.

(56) References Cited

U.S. PATENT DOCUMENTS 8,514,692 B2   8/2013  Laroia et al.

| 2006/0223538 | A1* | 10/2006 | Haseba et al. ................ 455/436 |
| 2009/0046672 | A1* | 2/2009 | Malladi et al. ................ 370/336 |
| 2009/0247181 | A1 | 10/2009 | Palanki et al. | |

FOREIGN PATENT DOCUMENTS

| JP | 11150749 A | 6/1999 |
| JP | 2012500545 A | 1/2012 |
| WO | 2006044718 A2 | 4/2006 |
| WO | 2009120934 A1 | 10/2009 |
| WO | 2010006285 A2 | 1/2010 |
| WO | 2010020478 A1 | 2/2010 |
| WO | 2010039738 A2 | 4/2010 |
| WO | WO2010039739 A2 | 4/2010 |
| WO | WO2010127332 A2 | 11/2010 |

OTHER PUBLICATIONS

LG Electronics, Title: Coordination for DL Control Channel in Co-channel CSG Deployment, 3GPP TSP RAN WG1 Meeting #61, Montreal, Canada, May 10-14, 2010.*
Ericsson et al: "Further technical aspects on heterogeneous network support for Rel-10", 3GPP Draft; R1-100868, 3rd Generation Partnership Project (3GPP), Mobile Competence Centre ; 650, Route Deslucioles ; F-06921 Sophia-Antipolis Cedex; France, vol. RAN WG1, No. San Francisco, USA; Feb. 22, 2010, Feb. 16, 2010, XP050418472, [retrieved on Feb. 16, 2010].

(Continued)

*Primary Examiner* — Wei Zhao
(74) *Attorney, Agent, or Firm* — Seyfarth Shaw LLP

(57) ABSTRACT

In co-channel heterogeneous networks, subframes may be partitioned between several evolved Node Bs (eNBs) including eNBs of different power classes. Lower power eNBs may have a reduced range due to interference from neighboring higher power eNBs. Rate matching on the UE allows the UE, during communication with a low power eNB, to avoid transmitting on Resource Elements (REs) which experience interference from common resource signals of an interfering base station.

60 Claims, 10 Drawing Sheets

(56) References Cited

OTHER PUBLICATIONS

Huawei: "LTE non-CA based HetNet support", 3GPP Draft; R1-101982, 3rd Generation Partnership Project (3GPP), Mobile Competence Centre ; 650, Route Des Lucioles ; F-06921 Sophia-Antipolis Cedex ; France, vol. RAN WG1, No. Beijing, china; Apr. 12, 2010, Apr. 6, 2010, XP050419319, [retrieved on Apr. 6, 2010].
International Search Report and Written Opinion—PCT/US2011/041213—ISA/EPO—Oct. 7, 2011.
LG Electronics: "Coordination for DL control channel in co-channel CSG deployment", 3GPP Draft; R1-102704, 3rd Generation Partnership Project (3GPP), Mobile Competence Centre ; 650, Route Deslucioles ; F-06921 Sophia-Antipolis Cedex; France, vol. RAN WG1, No. Montreal, Canada; May 10, 2010, May 7, 2010, XP050420379, [retrieved on May 7, 2010].
Qualcomm Europe: "Carrier Aggregation in Heterogeneous Networks", 3GPP Draft; R1-092062, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009, XP050339520, [retrieved Apr. 28, 2009].

* cited by examiner

RATE MATCHING FOR DATA AND CONTROL CHANNELS IN WIRELESS COMMUNICATION SYSTEMS

CROSS-REFERENCE TO RELATED APPLICATION

This application claims the benefit under 35 U.S.C. §119(e) to U.S. Provisional Patent Application No. 61/356,743, filed on Jun. 21, 2010, in the names of MONTOJO et al., the disclosure of which is expressly incorporated by reference herein in its entirety.

BACKGROUND

1. Field

Aspects of the present disclosure relate generally to wireless communication systems, and more particularly to rate matching of data and control channels to reduce interference from neighboring cells.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

A method for communicating in a wireless network is offered. The method includes determining a serving base station and interference from reference signals of an interfering base station. The method also includes receiving downlink communications from the serving base station. The downlink communications being are matched to exclude resources associated with the interfering reference signals.

An apparatus for wireless communication is offered. The apparatus includes means for determining a serving base station and interference from reference signals of an interfering base station. The apparatus also includes means for receiving downlink communications from the serving base station. The downlink communications are rate matched to exclude resources associated with the interfering reference signals.

A computer program product for wireless communication is offered. The computer program product includes a non-transitory computer-readable medium having non-transitory program code recorded thereon. The program code includes program code to determine a serving base station and interference from reference signals of an interfering base station. The program code also includes program code to receive downlink communications from the serving base station. The downlink communications are rate matched to exclude resources associated with the interfering reference signals.

An apparatus for wireless communication is offered. The apparatus includes a memory and a processor(s) coupled to the memory. The processor(s) is configured to determine a serving base station and interference from reference signals of an interfering base station. The processor(s) is also configured to receive downlink communications from the serving base station. The downlink communications are rate matched to exclude resources associated with the interfering reference signals.

A method for communicating in a wireless network is offered. The method includes determining, for a user equipment, interference from reference signals of an interfering base station. The method also includes instructing the user equipment to perform rate matching to exclude resources associated with the interfering reference signals.

An apparatus for wireless communication is offered. The apparatus includes means for determining, for a user equipment, interference from reference signals of an interfering base station. The apparatus also includes means for instructing the user equipment to perform rate matching to exclude resources associated with the interfering reference signals.

A computer program product for wireless communication is offered. The computer program product includes a non-transitory computer-readable medium having non-transitory program code recorded thereon. The program code includes program code to determine, for a user equipment, interference from reference signals of an interfering base station. The program code also includes program code to instruct the user equipment to perform rate matching to exclude resources associated with the interfering reference signals.

An apparatus for wireless communication is offered. The apparatus includes a memory and a processor(s) coupled to the memory. The processor(s) is configured to determine, for a user equipment, interference from reference signals of an interfering base station. The processor(s) is also configured to instruct the user equipment to perform rate matching to exclude resources associated with the interfering reference signals.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
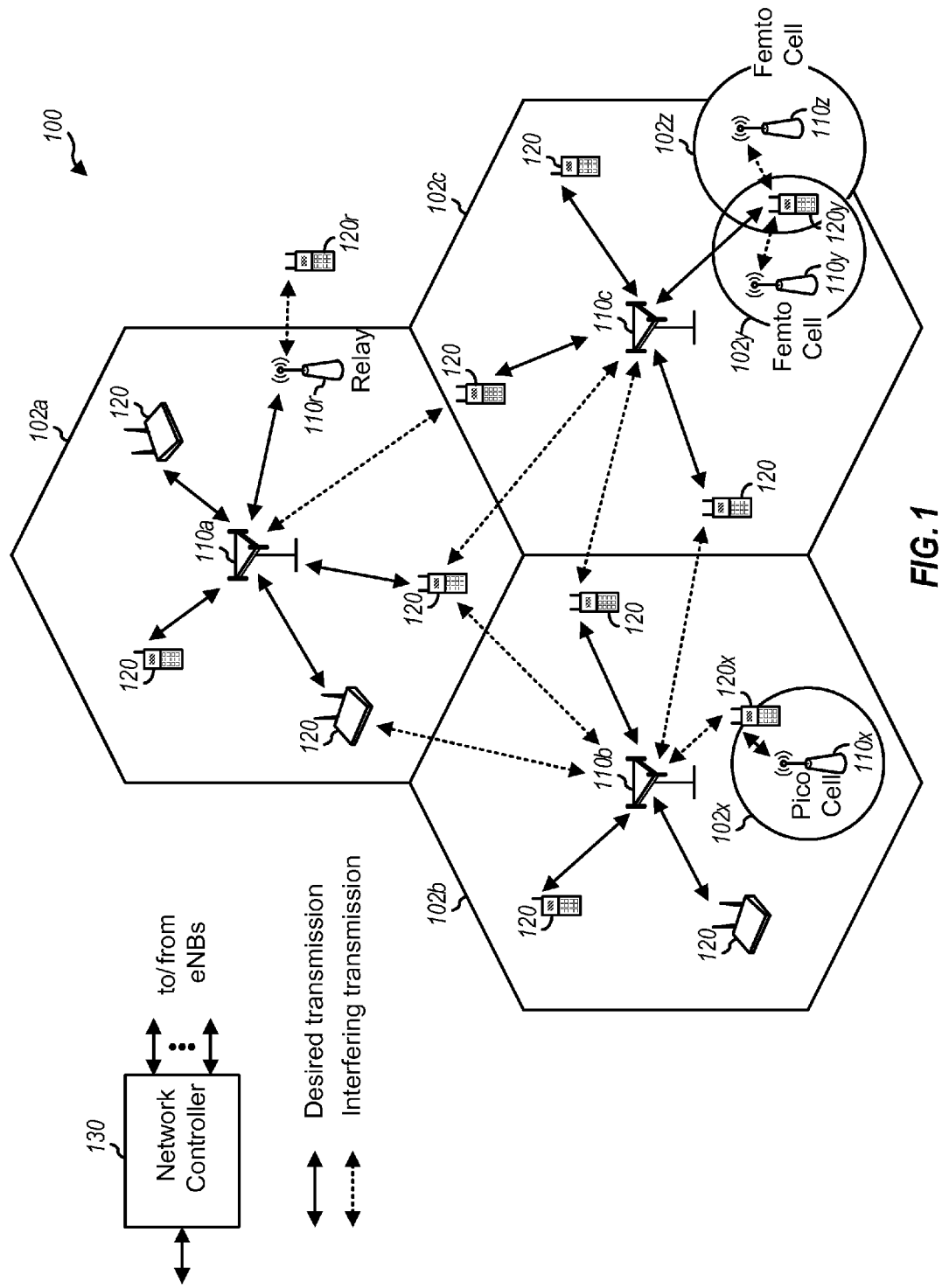
FIG. 1 is a block diagram conceptually illustrating an example of a telecommunications system.

FIG. 1 shows a wireless communication network 100, which may be an LTE-A network, in which rate matching of data and control channels to reduce interference from neighboring cells may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110*a*, 110*b* and 110*c* are macro eNodeBs for the macro cells 102*a*, 102*b* and 102*c*, respectively. The eNodeB 110*x* is a pico eNodeB for a pico cell 102*x*. And, the eNodeBs 110*y* and 110*z* are femto eNodeBs for the femto cells 102*y* and 102*z*, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
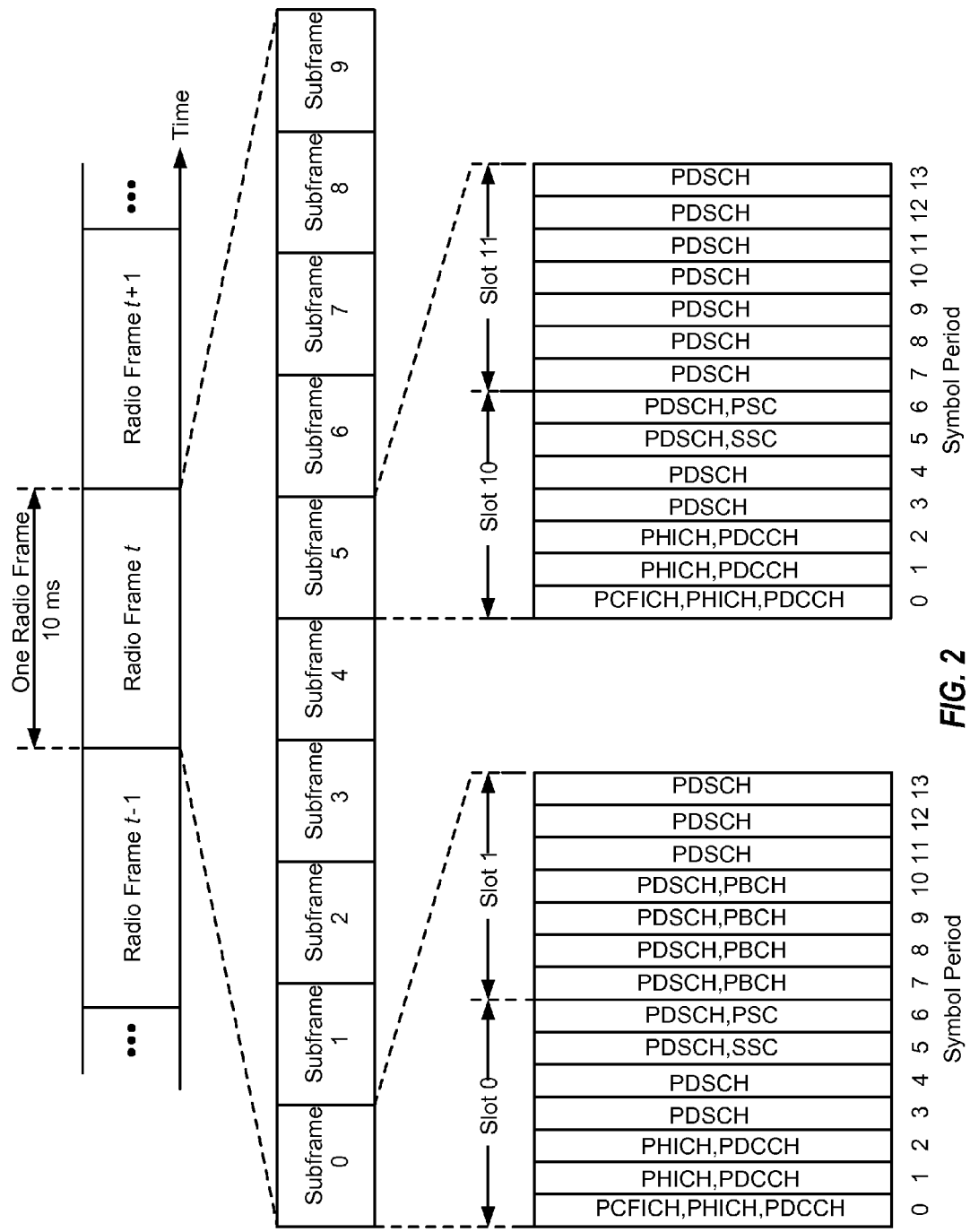
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic repeat request (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value.

For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
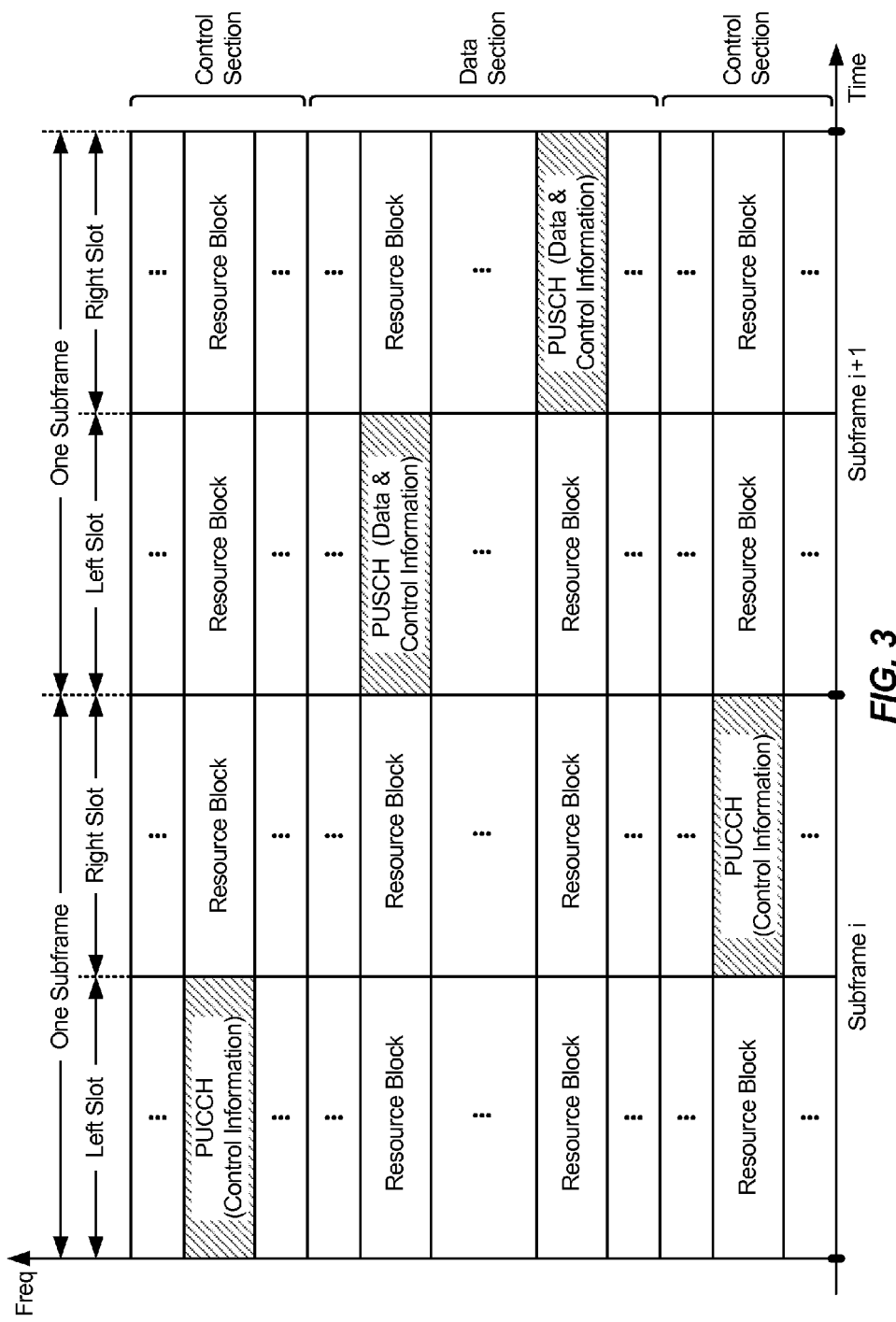
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
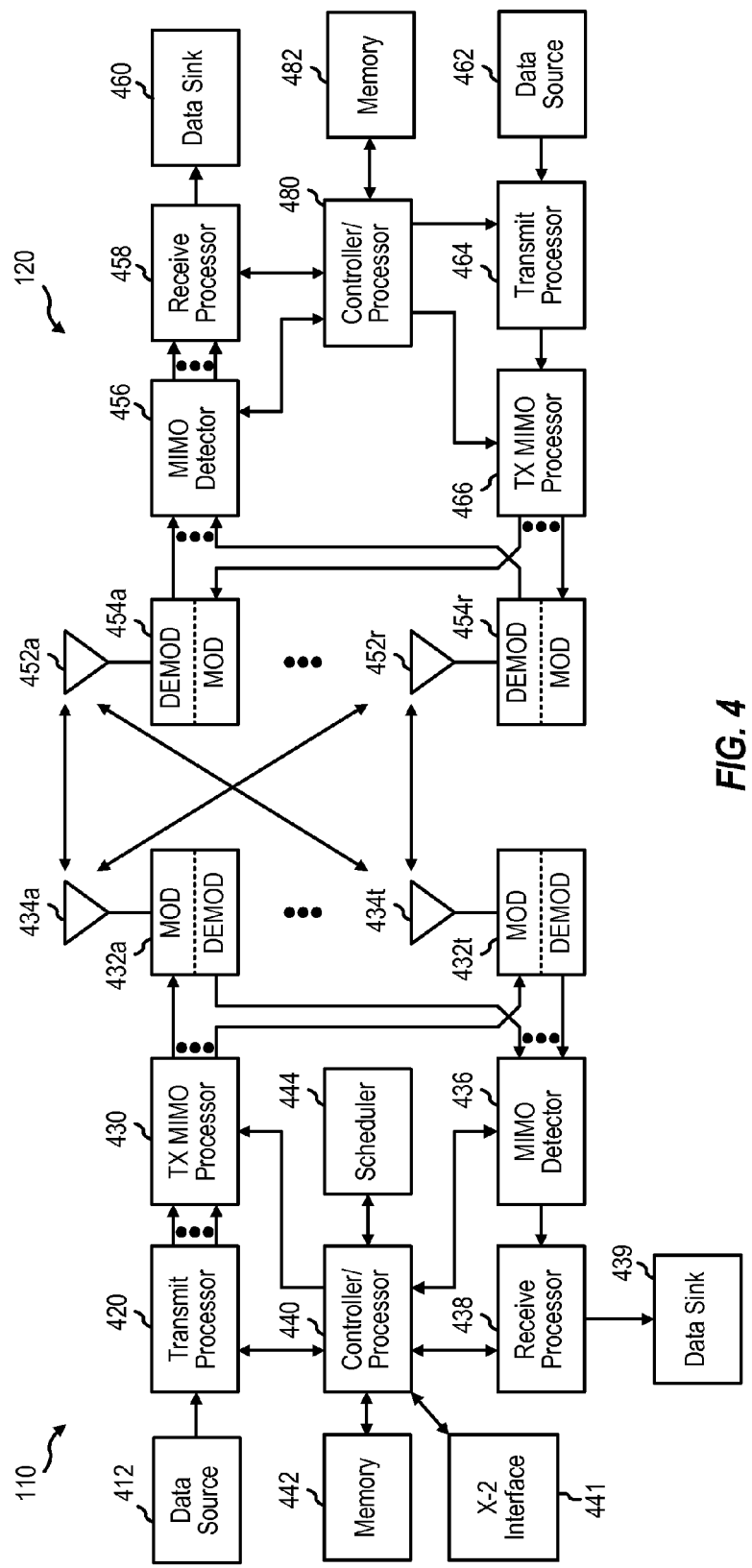
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use method flow chart FIG. 8, and/or other processes for the techniques described herein. The memories 442 and 482 may store data and program codes for the base station 110 and the UE 120, respectively. A scheduler 444 may schedule UEs for data transmission on the downlink and/or uplink.

Heterogeneous Networks

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Using coordinated interference management, the eNodeB 110c and the femto eNodeB 110y may communicate over the backhaul to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 μs (5 km÷3×108, i.e., the speed of light, 'c'). Comparing that downlink signal from the macro eNodeB to the downlink signal from a much closer femto eNodeB, the timing difference could approach the level of a time tracking loop (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Range Expansion in Heterogeneous Networks

Heterogeneous networks improve system capacity and throughput of wireless networks such as Long Term Evolution (LTE) and Long Term Evolution-Advanced (LTE-A) networks. When the available spectrum in the area of a heterogeneous network is limited, the heterogeneous network may be configured as a co-channel heterogeneous network to reduce resource consumption. Additionally, co-channel heterogeneous networks enable additional flexibility in the deployment of wireless networks.

A heterogeneous network may include several evolved Node Bs (eNBs) of different power classes. For example, a heterogeneous network may include macro eNBs, femto eNBs, and pico eNBs. Femto eNBs and pico eNBs (low power eNBs) operate at lower power levels than macro eNBs (macro eNBs). As a result, when low power eNBs are placed inside the coverage of a macro eNBs, the macro eNBs signal may interfere with the low power eNBs signal. For example, a signal strength received by a UE from a low power eNBs or macro eNBs decays proportional to the radial distance of the UE from the low power eNBs or the macro eNBs. The coverage area of low power eNBs is often restricted by the signal strength of the macro eNBs. That is, at certain radial distances from the low power eNBs, the signal strength of the low power eNBs may be usable by a UE except for interference from one or more macro eNBs.

Expanding the range of low power eNBs increases flexibility in a heterogeneous network by allowing the low power eNBs to serve more UEs. Additionally, spectral efficiency is increased when UEs are offloaded to the low power eNBs. Range expansion of low power eNBs may occur when the macro eNBs free up interfering resources, which will be described with reference to FIGS. 5A and 5B.

Figure 5B:
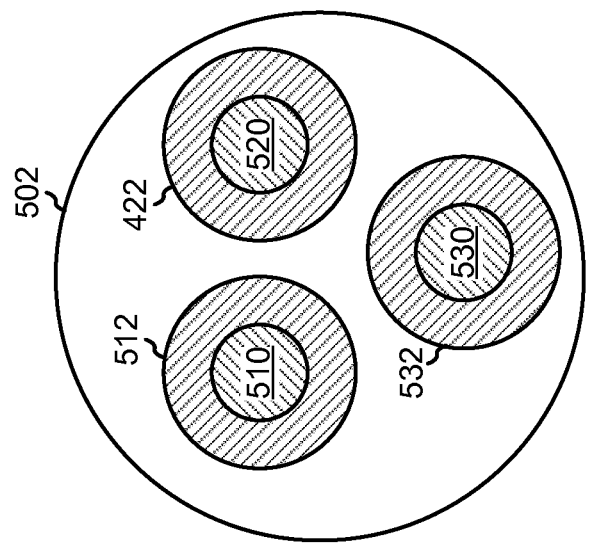
FIG. 5B is a block diagram illustrating a co-channel heterogeneous network in range expansion according to one aspect of the disclosure.
Figure 5A:
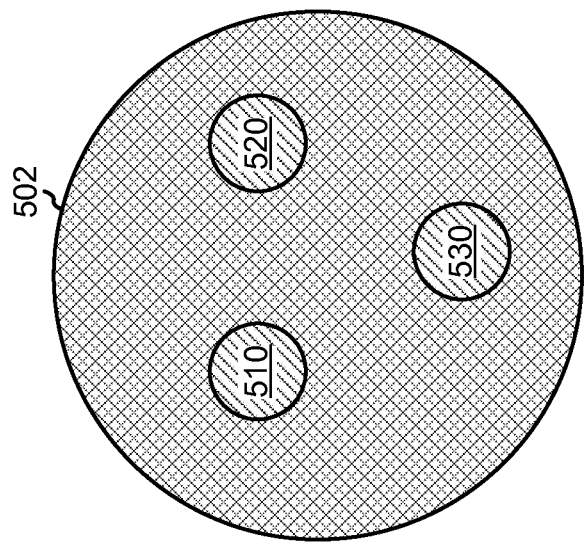
FIG. 5A is a block diagram illustrating a co-channel heterogeneous network according to one aspect of the disclosure.

FIG. 5A is a block diagram illustrating a co-channel heterogeneous network according to one aspect of the disclosure. A macro eNB coverage area is illustrated by an area 502. Within the macro eNB coverage area 502 are low power eNB coverage areas 510, 520, 530. The low power eNB coverage areas 510, 520, 530 are limited in range by interference from the macro eNB coverage area 502. Thus, if the macro eNB coverage area 502 frees up resources, the range of the low power eNB coverage areas 510, 520, 530 may increase.

FIG. 5B is a block diagram illustrating a co-channel heterogeneous network in range expansion according to one aspect of the disclosure. After the macro eNB coverage area 502 frees up resources, interference restricting the range of the low power eNB coverage areas 510, 520, 530 is reduced. The range of the low power eNB coverage areas 510, 520, 530 is extended to include the low power eNB range extension coverage areas 512, 522, 532, respectively.

Rate Matching for Data and Control Channels in Range Expansion

When the macro eNB of a heterogeneous network frees up resources to allow range expansion of low power eNB, the macro eNB may continue to transmit a number of legacy control channels and pilot channels to support legacy UEs such as, for example, 3GPP Release 8 and Release 9 UEs. Thus, to maintain backward compatibility, the macro eNB may support either Multicast/Broadcast Single Frequency Network (MBSFN) subframes or "almost-blank" subframes in which no signals beyond transmit legacy signals and channels such as a common reference signal (CRS) are broadcast.

MBSFN subframes are subject to configuration constraints on the wireless network. Conventionally, at most 6 of every 10 subframes may be a MBSFN subframe. Almost-blank subframes are a part of Time Division Multiplexing (TDM) partitioning during which time resources are freed up but legacy signals and channels may still be transmitted. During an almost-blank subframe, Common Reference Signals (CRSs) are transmitted at a nominal power in each subframe in all corresponding Orthogonal Frequency Division Multiplexing (OFDM) symbols, Primary Synchronization Sequence (PSS) and Secondary Synchronization Sequence (SSS) are transmitted at a nominal power in all cells at each occurrence, and the Physical Broadcast Channel (PBCH) is transmitted at a nominal power in each frame. Additionally, the Physical Control Format Indicator Channel (PCFICH), the Physical Hybrid ARQ Indicator Channel (PHICH), the Physical Downlink Control Channel (PDCCH), and the Physical Downlink Shared Channel (PDSCH) are transmitted based, in part, on scheduling decisions, and uplink channels are transmitted based, in part, on scheduling decisions and configuration.

Figure 6:
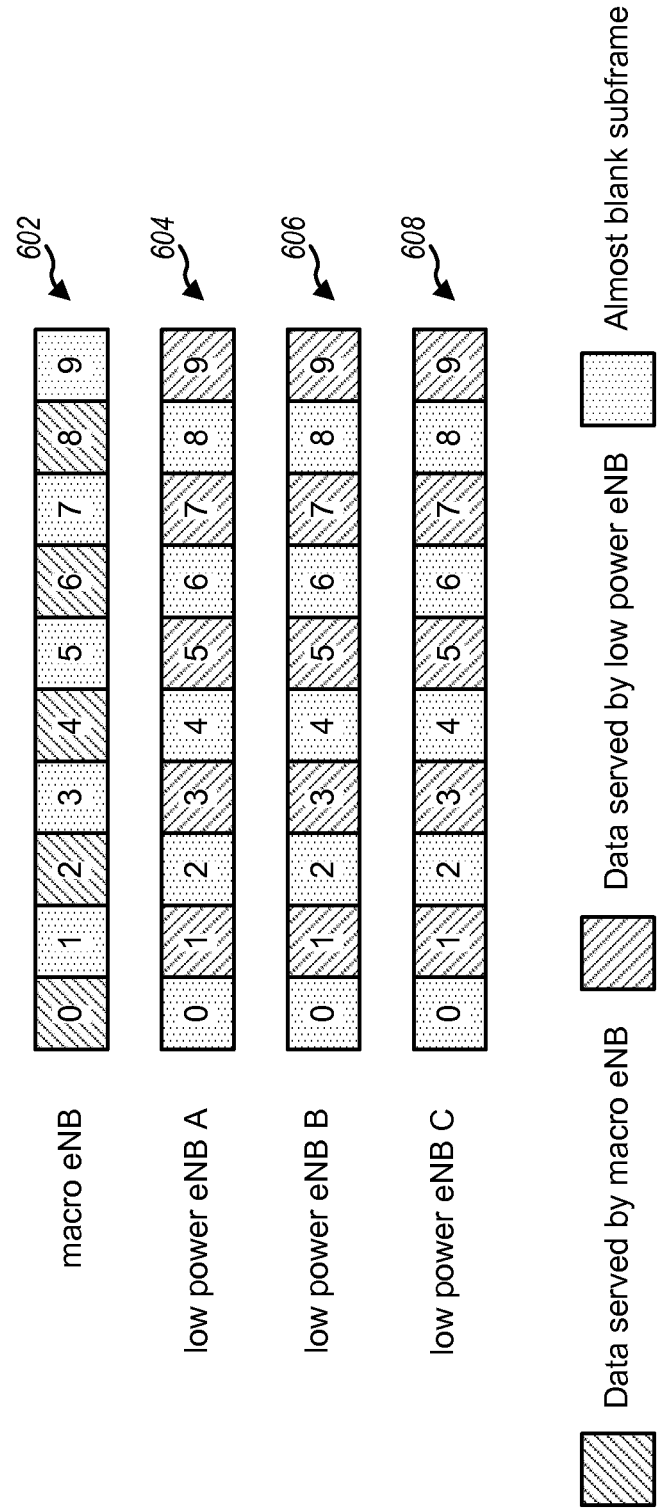
FIG. 6 is a block diagram illustrating subframe resources in a co-channel heterogeneous network according to one aspect of the disclosure.

FIG. 6 is a block diagram illustrating subframe resources in a co-channel heterogeneous network according to one aspect of the disclosure. A first row 602 of FIG. 6 illustrates a series of subframes at a macro eNB having, for example, a coverage area corresponding to area 502 of FIG. 5. A second row 604 illustrates a series of subframes at a first low power eNB (eNB A) having, for example, a coverage area corresponding to areas 510, 512 of FIG. 5. A third row 606 illustrates a series of subframes at a second low power eNB (eNB B) having, for example, a coverage area corresponding to areas 520, 522 of FIG. 5. A fourth row 608 illustrates a series of subframes at a third low power eNB (eNB C) having, for example, a coverage area corresponding to areas 530, 532 of FIG. 5.

In subframe 0, the macro eNB may serve data to UEs in the coverage area 520. Subsequently in subframe 1, the macro eNB frees up resources during which the lower power eNBs A, B, and C serve data to UEs in the coverage areas 510 and 512, 520 and 522, and 530 and 532, respectively. Because the macro eNB is transmitting almost-blank subframes, the range of the low power eNBs A, B, and C increases to include the areas 512, 522, and 532 of FIG. 5, respectively. Although the macro eNB and low power eNBs are demonstrated as alternating one subframe assigned to the macro eNB and one subframe assigned to the low power eNB, any partitioning of the subframes may be selected.

Subframes transmitted by the macro eNB and the low power eNBs A, B, and C may include legacy signals and channels such that the subframes are "almost-blank." For example, during subframe 1 the macro eNB transmits legacy signals and channels such as a CRS.

CRSs from other eNBs may still cause interference with low power eNBs during almost-blank subframes. Newer UEs may have the capability to perform Reference Signal-Interference Cancellation (RS-IC) to cancel interference from other eNBs. However, older UEs, such as legacy UEs, may not include RS-IC functionality. Thus, there is a need to reduce CRS interference from other eNBs during range extension operation of low power nodes.

CRSs from low power eNBs may also interfere with macro eNBs. As an example, a closed subscriber group (CSG) femto cell may only serve a certain group of UEs. If a macro UE is close to a femto cell and is restricted from accessing the femto cell, the macro UE may be interfered by the CRS from the femto cell, even if the femto cell is configured with almost blank subframes.

Figure 7:
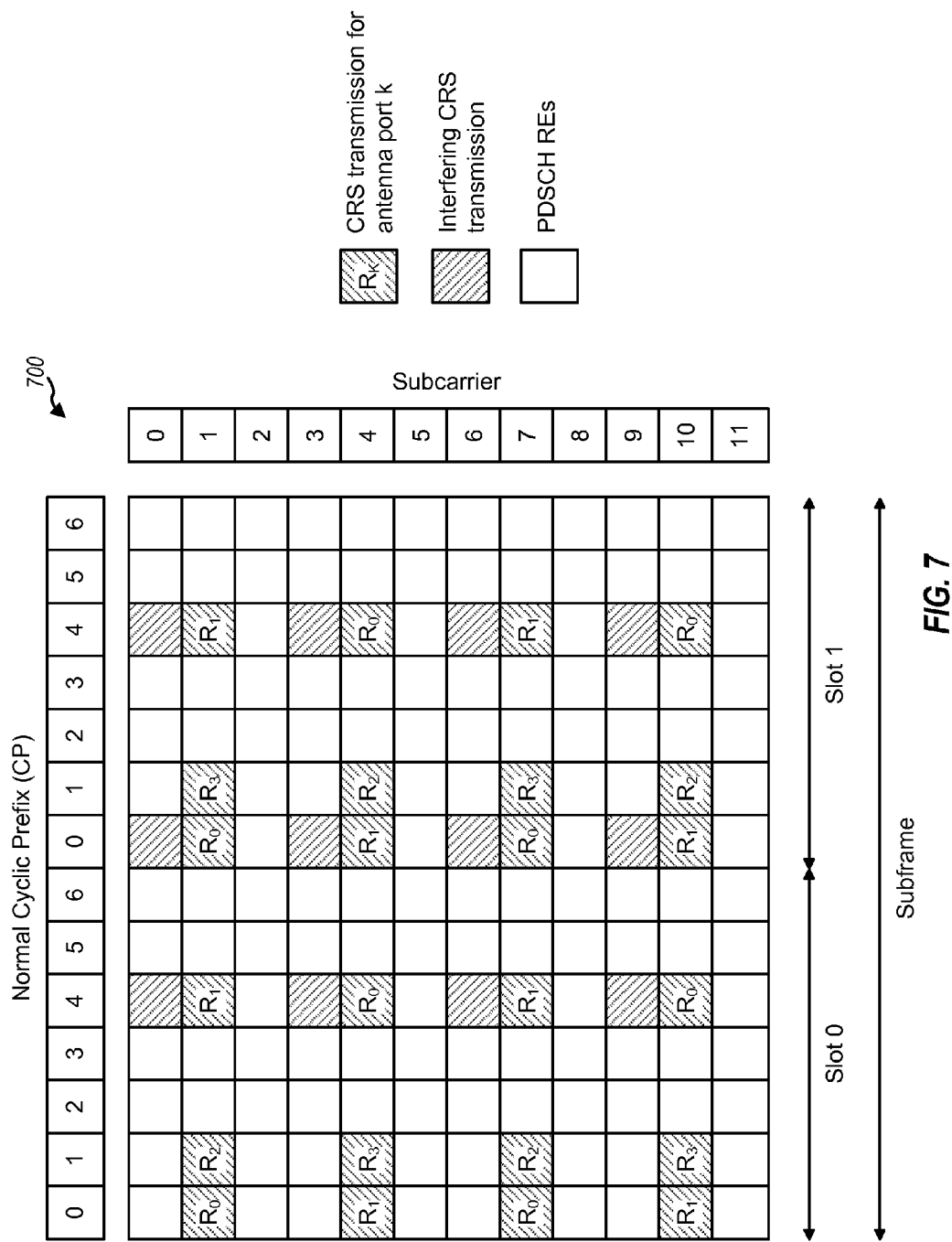
FIG. 7 is a block diagram illustrating data transmission in a co-channel heterogeneous network according to one aspect of the disclosure.

According to one aspect, rate matching may be performed on data channels or control channels of an eNB to reduce interference from another eNB's CRSs. Specifically, a UE may be instructed to not use specific resources, thereby matching to a lower data rate. The data rate may be selected for a UE to account for the interfering neighbor eNB's CRSs. For example, UEs in range expansion may be instructed not to use Resource Elements (REs) corresponding to an interfering neighbor eNB's CRS REs. Determination of the resource elements for rate matching in range expansion is described with reference to FIG. 7. In this manner, a UE may be directed to use only resource elements not subject to strong interference, thereby achieving a desired level of downlink throughput. FIG. 7 is a block diagram illustrating data transmission in a co-channel heterogeneous network according to one aspect of the disclosure.

A table 700 illustrates resource elements according to normal Cyclic Prefix (CP) in columns and subcarriers in rows. Macro eNBs may employ Physical Cell Identifiers (PCIs) resulting in one CRS offset. For example, the CRS offset of a macro eNB may be determined from the modulus of the PCI of the macro eNB and the value 3. Low power eNBs, such as pico eNBs, may employ another CRS offset. For example, the CRS offset of a low power eNB may be determined from the modulus of the PCI of the low power eNB and the value 3.

FIG. 7 shows an RE mapping for one Resource Block (RB) according to one aspect in which the macro eNB CRS offset is 0, the low power eNB CRS offset is 1, and interfering neighbor eNBs have two CRS antenna ports. CRS transmissions for the low power eNB are shown in resource elements labeled with R0, R1, R2, and R3 for the antenna ports of the low power eNB, respectively. For example, the OFDM symbol with normal cyclic prefix 0 at subcarrier 1 of slot 0 has a CRS transmission for the first antenna port of the cell. Additionally, the OFDM symbol with normal cyclic prefix 1 at subcarrier 1 of slot 0 has a CRS transmission for the third antenna port of the low power eNB.

CRS transmission for interfering neighbor eNBs, such as a macro eNB, are also shown in certain resource elements. For example, the OFDM symbol with normal cyclic prefix 4 at subcarrier 0 of slot 0 has interference from a neighbor eNB CRS. Additionally, the OFDM symbol with normal cyclic prefix 0 at subcarrier 0 of slot 1 has interference from a neighbor eNB CRS.

During rate matching, a UE does not use resource elements corresponding to the interfering neighbor eNB CRS. Referring to FIG. 7, a UE in rate matching may not use, at normal cyclic prefix, subcarrier 0 in slot 0 in OFDM symbol 4 because an interfering eNB is transmitting CRS during that resource element.

Figure 8:
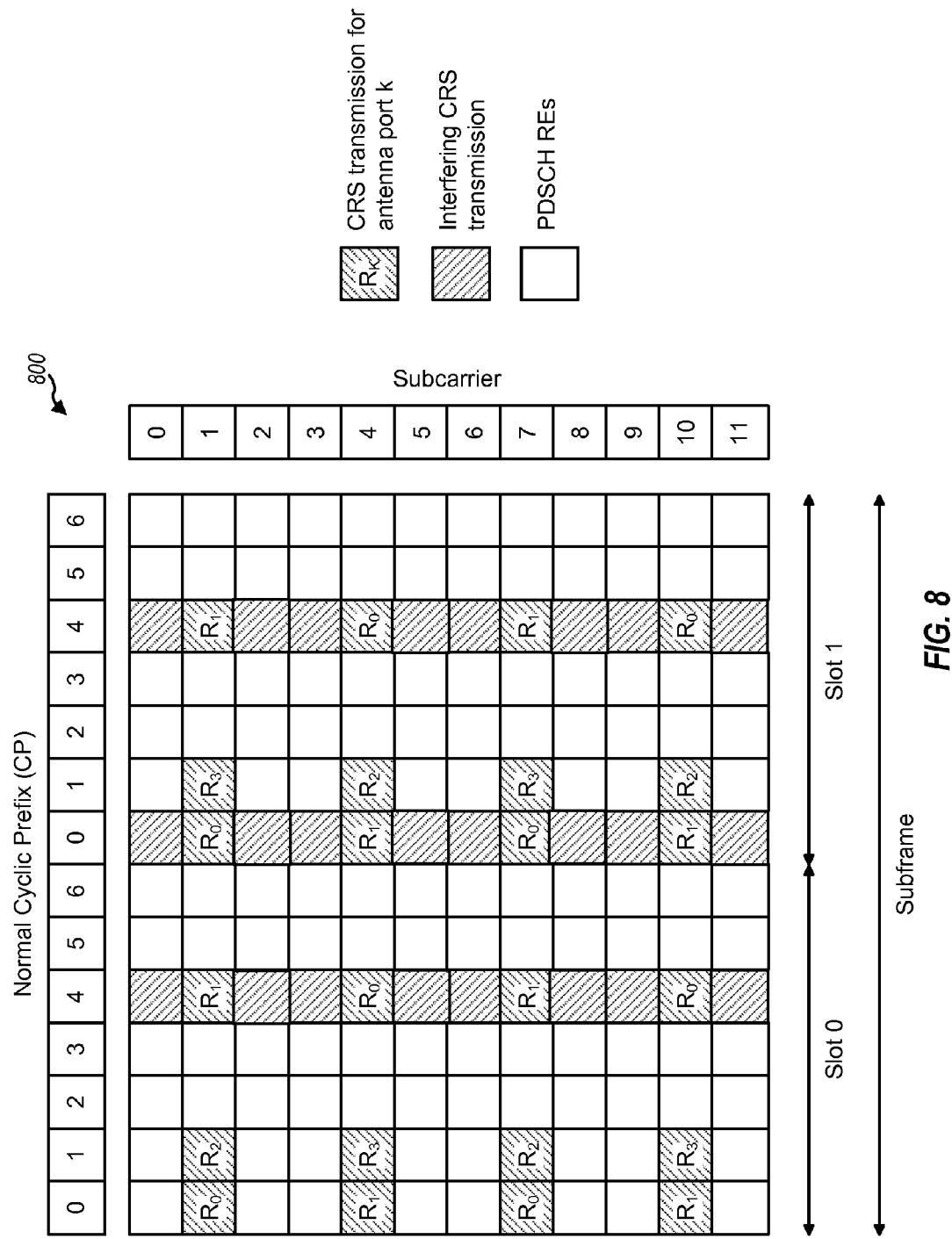
FIG. 8 is a block diagram illustrating data transmission in a co-channel heterogeneous network according to one aspect of the disclosure.

When there are two or more interfering cells, rate matching may be performed by taking into account the CRS offsets of the two or more interfering cells. As an example, if the two or more interfering cells have the same CRS offset, a same rate-matching as shown in FIG. 7 can apply. As another example, if the two or more interfering cells have different CRS offsets, additional resources may be excluded from rate-matching. Referring to FIG. 8, a UE in rate matching may not use the entire OFDM symbol 4 because two or more interfering cells simultaneously have CRS offsets 0 and 2, as seen in the RE mapping 800.

Signaling of rate matching may be UE-specific or cell-specific. If signaling of rate matching is UE-specific, the signaling may be performed in higher layers, such as layer 3, or on the Physical Downlink Control Channel (PDCCH). If signaling of rate matching is cell-specific, the cell may indicate UEs to use rate matching through a broadcast signal or a dedicated signal. Rate matching may be enabled or disabled depending, in part, on UE capability. For example, newer UEs with RS-IC (reference signal interference cancellation) capability may be instructed to disable rate matching because RS-IC allows the UE to cancel the interference from a neighbor CRS. Rate matching may also be enabled or disabled based on measured interference levels at the UE. For example, if the UE measures low interference levels, the UE may be instructed to disable rate matching.

For determining the resource elements to not use during rate matching, an eNB may indicate to the UE the number of resource elements or which resource elements to not use. For example, the eNB may indicate to the UE the number of CRS antenna ports of interfering eNBs. Alternatively, the UE may assume a fixed number of CRS antenna ports such that signaling to the UE is reduced. According to one aspect, the UE assumes four CRS antenna ports for interfering eNBs. According to another aspect, the UE assume two CRS antenna ports for interfering eNBs. According to another aspect, the eNB may indicate to the UE the offset(s) of the CRS antenna ports of interfering eNBs. Alternatively, the UE may assume a fixed offset of CRS antenna ports such that signaling to the UE is reduced. The fixed offset may be relative to the offset of the CRS antenna ports of the serving cell. According to another aspect, the UE may assume that all other CRS offsets not being used by the serving cells are for interfering eNBs.

The new rate matching may be applied to an assignment in one subframe. Additionally, a subframe may mix different rate matching schemes, such as a new rate matching scheme and an old rate matching scheme. When a UE is instructed for new rate matching, the new rate matching may be enabled for all subframes or a subset of all subframes. A rate matching scheme may also depend on whether the data is unicast or multicast. The UE may be informed through signaling from the cell of the subset of subframes for which to apply the new rate matching. For instance, for the set of subframes when the interfering cells use MBSFN subframes, the new rate matching can be disabled.

Additionally, rate matching may be enabled or disabled based, in part, on a modulation scheme of the PDSCH. For example, if the modulation of the PDSCH is Quadrature Phase-Shift Key (QPSK), modulation rate matching may be disabled. In another example, if the modulation of the PDSCH is a higher modulation such as 16-Quadrature Amplitude Modulation (16-QAM), rate matching may be enabled. Rate matching may also be enabled or disabled by the type of PDSCH. For example, when the PDSCH is a broadcast channels such as the Physical Broadcast Channel (PBCH), the System Information Block 1 (SIB1), the System Information Block 2 (SIB2), or the Paging Channel, rate matching may be disabled. Further, rate matching may be enabled or disabled based on a System Frame Number (SFN) and subframe number. For example, a specific set of subframes may have rate matching enabled or disabled.

The new rate matching is also applicable to any new control designs utilizing the data region, e.g., the Relay-Physical Downlink Control Channel (R-PDCCH). A R-PDCCH is a new type of control channel utilizing the data region originally developed in the context of half-duplex relay operation. Different from the legacy PDCCH, which occupies the first several control symbols in one subframe, the R-PDCCH is mapped to resource elements originally designated as the data region. The new control channel may be in the form of Frequency Division Multiplexing (FDM), Time Division Multiplexing (TDM), or a combination of FDM and TDM.

Figure 9:
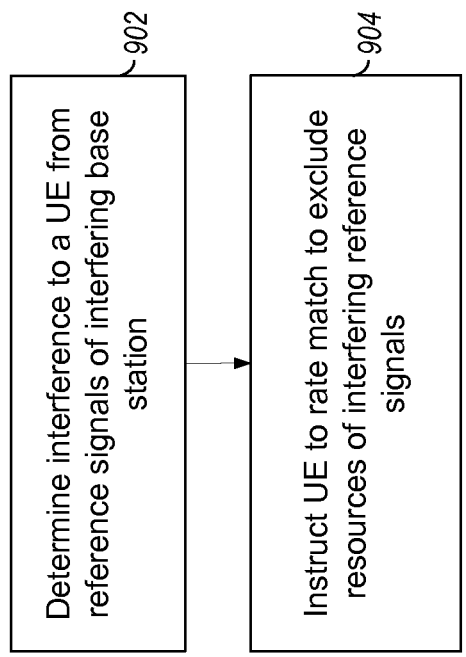
FIG. 9 is a block diagram illustrating a method for rate matching in a wireless network according to one aspect of the disclosure.

FIG. 9 is a functional block diagram illustrating example blocks executed to implement one aspect of the present disclosure. In block 902 an apparatus, such as a base station, determines, for a user equipment, interference from reference signals of an interfering base station. In block 904 the apparatus instructs the user equipment to perform rate matching to exclude resources associated with the interfering reference signals.

Figure 10:
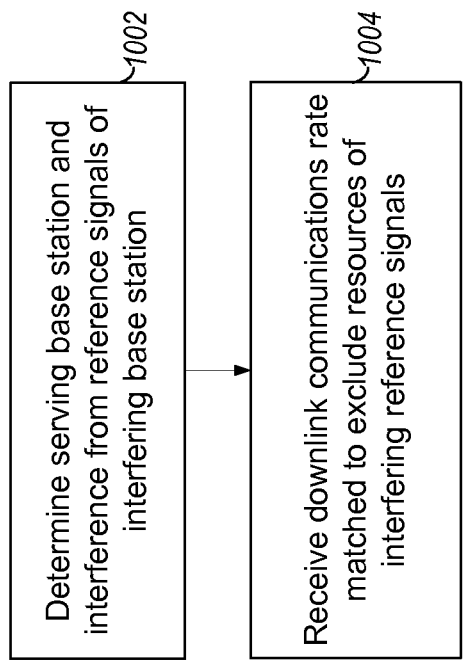
FIG. 10 is a block diagram illustrating a method for rate matching in a wireless network according to one aspect of the disclosure.

FIG. 10 is a functional block diagram illustrating example blocks executed to implement one aspect of the present disclosure. In block 1002 an apparatus, such as a user equipment, determines a serving base station and interference from reference signals of an interfering base station. In block 1004 the apparatus receives downlink communications from the serving base station. The downlink communications are rate matched to exclude resources associated with the interfering reference signals.

In one configuration, an apparatus for wireless communication includes means for determining, for a user equipment, interference from reference signals of an interfering base station. In one aspect, the aforementioned means may be the antennae 434a-t, demodulators 432a-t, receive processor 438, controller/processor 440, and/or memory 442 configured to perform the functions recited by the aforementioned means. The apparatus also includes means instructing the user equipment to perform rate matching to exclude resources associated with the interfering reference signals. In one aspect, the aforementioned means may be the antennae 434a-t, controller/processor 440, transmit processor 420, modulators 432a-t, memory 442, and/or scheduler 444 configured to perform the functions recited by the aforementioned means. In another aspect, the aforementioned means may be a module or any apparatus configured to perform the functions recited by the aforementioned means.

In one configuration, an apparatus for wireless communication includes means for determining a serving base station and interference from reference signals of an interfering base station. In one aspect, the aforementioned means may be the antennae 452a-t, demodulators 454a-r, receive processor 458, controller/processor 480, and/or memory 482 configured to perform the functions recited by the aforementioned means. The apparatus also includes means for receiving downlink communications from the serving base station, the downlink communications being rate matched to exclude resources associated with the interfering reference signals. In one aspect, the aforementioned means may be the antennae 452a-t, modulators 454a-t, receive processor 458, controller/processor 480, and/or memory 482 configured to perform the functions recited by the aforementioned means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for communicating in a wireless network, comprising:
   determining a serving base station and interference from reference signals of an interfering base station; and
   receiving downlink communications from the serving base station, the downlink communications of the serving base station being rate matched based on a first rate matching scheme and a second rate matching scheme, the first rate matching scheme being for a set of resources associated with interfering reference signals in a first set of subframes and the second rate matching scheme being for a set of resources associated with interfering reference signals in a second set of subframes, the first rate matching scheme excluding the set of resources associated with the interfering reference signals of the first set of subframes, and disabling the rate matching for Multicast/Broadcast Single frequency Network (MBSFN) subframes of the interfering base station.

2. The method of claim 1 further comprising receiving at least one of data and control channels in resource elements other than resource elements associated with interfering reference signals.

3. The method of claim 2 in which the receiving comprises receiving by a user equipment in range expansion.

4. The method of claim 1 further comprising employing a same rate matching scheme for all subframes.

5. The method of claim 1 in which the method is executed in a user equipment not capable of interference cancellation.

6. The method of claim 1 further comprising receiving a rate matching scheme on a physical downlink control channel.

7. The method of claim 1 further comprising receiving a rate matching scheme on a broadcast signal or a dedicated channel.

8. The method of claim 1 in which a rate matching scheme is specific to a user equipment.

9. The method of claim 1 in which a rate matching scheme is specific to a base station.

10. The method of claim 1 in which rate matching is performed when the interference from the reference signals exceeds a certain threshold.

11. The method of claim 1 in which a rate matching scheme is based on a number of common reference signal antenna ports for the interfering base station.

12. The method of claim 1 in which a rate matching scheme is based on whether data is unicast or multicast.

13. The method of claim 1 in which a rate matching scheme is based on a modulation scheme.

14. The method of claim 1 in which a rate matching scheme is based on a system frame number or a subframe number.

15. The method of claim 1 in which a rate matching scheme is based on a channel type.

16. The method of claim 1 in which the reference signals comprise common reference signals.

17. An apparatus for wireless communication, the apparatus comprising:
   means for determining a serving base station and interference from reference signals of an interfering base station; and
   means for receiving downlink communications from the serving base station, the downlink communications of the serving base station being rate matched based on a first rate matching scheme and a second rate matching scheme, the first rate matching scheme being for a set of resources associated with interfering reference signals in a first set of subframes and the second rate matching scheme being for a set of resources associated with interfering reference signals in a second set of subframes, the first rate matching scheme excluding the set of resources associated with the interfering reference signals of the first set of subframes, and disabling the rate matching for Multicast/Broadcast Single frequency Network (MBSFN) subframes of the interfering base station.

18. A computer program product for wireless communication, the computer program product comprising:
   a non-transitory computer-readable medium having non-transitory program code recorded thereon, the program code comprising:
      program code to determine a serving base station and interference from reference signals of an interfering base station; and program code to receive downlink communications from the serving base station, the downlink communications of the serving base station being rate matched based on a first rate matching scheme and a second rate matching scheme, the first rate matching scheme being for a set of resources associated with interfering reference signals in a first set of subframes and the second rate matching scheme being for a set of resources associated with interfering reference signals in a second set of subframes, the first rate matching scheme excluding the set of resources associated with the interfering reference signals of the first set of subframes, and disabling the rate matching for Multicast/Broadcast Single frequency Network (MBSFN) subframes of the interfering base station.

19. An apparatus for wireless communication, the apparatus comprising:
a memory; and
at least one processor coupled to the memory, the at least one processor being configured:
to determine a serving base station and interference from reference signals of an interfering base station; and
to receive downlink communications from the serving base station, the downlink communications of the serving base station being rate matched based on a first rate matching scheme and a second rate matching scheme, the first rate matching scheme being for a set of resources associated with interfering reference signals in a first set of subframes and the second rate matching scheme being for a set of resources associated with interfering reference signals in a second set of subframes, the first rate matching scheme excluding the set of resources associated with the interfering reference signals of the first set of subframes, and disabling the rate matching for Multicast/Broadcast Single frequency Network (MBSFN) subframes of the interfering base station.

20. The apparatus of claim 19 in which the at least one processor is further configured to receive data and/or control channels in resource elements other than resource elements associated with interfering reference signals.

21. The apparatus of claim 20 in which the apparatus is a user equipment in range expansion.

22. The apparatus of claim 19 in which the at least one processor is further configured to employ a same rate matching scheme for all subframes.

23. The apparatus of claim 19 in which the apparatus is a user equipment not capable of interference cancellation.

24. The apparatus of claim 19 in which the at least one processor is further configured to receive a rate matching scheme on a physical downlink control channel.

25. The apparatus of claim 19 in which the at least one processor is further configured to receive a rate matching scheme on a broadcast signal or a dedicated channel.

26. The apparatus of claim 19 in which a rate matching scheme is specific to a user equipment.

27. The apparatus of claim 19 in which a rate matching scheme is specific to a base station.

28. The apparatus of claim 19 in which the rate matching is performed when the interference exceeds a certain threshold.

29. The apparatus of claim 19 in which a rate matching scheme is based on a number of common reference signal antenna ports for the interfering base station.

30. The apparatus of claim 19 in which a rate matching scheme is based on whether data is unicast or multicast.

31. The apparatus of claim 19 in which a rate matching scheme is based on a modulation scheme.

32. The apparatus of claim 19 in which a rate matching scheme is based on a system frame number or a subframe number.

33. The apparatus of claim 19 in which a rate matching scheme is based on a channel type.

34. The apparatus of claim 19 in which the reference signals are common reference signals.

35. A method for communicating in a wireless network, comprising:
determining, for a user equipment, interference from reference signals of an interfering base station; and
instructing the user equipment to perform rate matching on downlink communications from the serving base station, the downlink communications of the serving base station being rate matched based on a first rate matching scheme and a second rate matching scheme, the first rate matching scheme being for a set of resources associated with interfering reference signals in a first set of subframes and the second rate matching scheme being for a set of resources associated with interfering reference signals in a second set of subframes, the first rate matching scheme excluding the set of resources associated with the interfering reference signals of the first set of subframes, and disabling the rate matching for Multicast/Broadcast Single frequency Network (MBSFN) subframes of the interfering base station.

36. The method of claim 35 further comprising transmitting at least one of data and control channels to the user equipment in resource elements other than resource elements associated with the interfering reference signals.

37. The method of claim 35 further comprising employing a same rate matching scheme for all subframes.

38. The method of claim 35 in which a rate matching scheme is specific to the user equipment.

39. The method of claim 35 in which a rate matching scheme is specific to a base station.

40. The method of claim 35 in which the rate matching is performed when the interference to the user equipment exceeds a certain threshold.

41. The method of claim 35 in which a rate matching scheme is based on a number of common reference signal antenna ports for the interfering base station.

42. The method of claim 35 in which a rate matching scheme is based on whether data is unicast or multicast.

43. The method of claim 35 in which a rate matching scheme is based on a modulation scheme.

44. The method of claim 35 in which a rate matching scheme is based on a system frame number or a subframe number.

45. The method of claim 35 in which a rate matching scheme is based on a channel type.

46. The method of claim 35 in which the reference signals comprise common reference signals.

47. An apparatus for wireless communication, the apparatus comprising:
means for determining, for a user equipment, interference from reference signals of an interfering base station; and
means for instructing the user equipment to perform rate matching on downlink communications from the serving base station, the downlink communications of the serving base station being rate matched based on a first rate matching scheme and a second rate matching scheme, the first rate matching scheme being for a set of resources associated with interfering reference signals in a first set of subframes and the second rate matching scheme being for a set of resources associated with interfering reference signals in a second set of subframes, the first rate matching scheme excluding the set of resources associated with the interfering reference signals of the first set of subframes, and disabling the rate matching for Multicast/Broadcast Single frequency Network (MBSFN) subframes of the interfering base station.

48. A computer program product for wireless communication, the computer program product comprising:
- a non-transitory computer-readable medium having non-transitory program code recorded thereon, the program code comprising:
    - program code to determine, for a user equipment, interference from reference signals of an interfering base station; and
    - program code to instruct the user equipment to perform rate matching on downlink communications from the serving base station, the downlink communications of the serving base station being rate matched based on a first rate matching scheme and a second rate matching scheme, the first rate matching scheme being for a set of resources associated with interfering reference signals in a first set of subframes and the second rate matching scheme being for a set of resources associated with interfering reference signals in a second set of subframes, the first rate matching scheme excluding the set of resources associated with the interfering reference signals of the first set of subframes, and disabling the rate matching for Multicast/Broadcast Single frequency Network (MBSFN) subframes of the interfering base station.

49. An apparatus for wireless communication, the apparatus comprising:
- a memory; and
- at least one processor coupled to the memory, the at least one processor being configured:
    - to determine, for a user equipment, interference from reference signals of an interfering base station; and
    - to instruct the user equipment to perform rate matching on downlink communications from the serving base station, the downlink communications of the serving base station being rate matched based on a first rate matching scheme and a second rate matching scheme, the first rate matching scheme being for a set of resources associated with interfering reference signals in a first set of subframes and the second rate matching scheme being for a set of resources associated with interfering reference signals in a second set of subframes, the first rate matching scheme excluding the set of resources associated with the interfering reference signals of the first set of subframes, and disabling the rate matching for Multicast/Broadcast Single frequency Network (MBSFN) subframes of the interfering base station.

50. The apparatus of claim 49 in which the at least one processor is further configured to transmit at least one of data and control channels to the user equipment in resource elements other than resource elements associated with the interfering reference signals.

51. The apparatus of claim 49 in which the at least one processor is further configured to employ a same rate matching scheme for all subframes.

52. The apparatus of claim 49 in which a rate matching scheme is specific to the user equipment.

53. The apparatus of claim 49 in which a rate matching scheme is specific to a base station.

54. The apparatus of claim 49 in which the at least one processor is further configured to instruct the user equipment to perform rate matching when the interference to the user equipment exceeds a certain threshold.

55. The apparatus of claim 49 in which a rate matching scheme is based on a number of common reference signal antenna ports for the interfering base station.

56. The apparatus of claim 49 in which a rate matching scheme is based on whether data is unicast or multicast.

57. The apparatus of claim 49 in which a rate matching scheme is based on a modulation scheme.

58. The apparatus of claim 49 in which a rate matching scheme is based on a system frame number or a subframe number.

59. The apparatus of claim 49 in which a rate matching scheme is based on a channel type.

60. The apparatus of claim 49 in which the reference signals comprise common reference signals.

\* \* \* \* \*